(12) United States Patent
Taylor et al.

(10) Patent No.: US 7,908,607 B2
(45) Date of Patent: Mar. 15, 2011

(54) EFFICIENT MARSHALLING BETWEEN SOAP AND BUSINESS-PROCESS MESSAGES

(75) Inventors: John Anthony Taylor, Bellevue, WA (US); David Leon Stucki, Kirkland, WA (US); Jean-Emile Elien, Bellevue, WA (US); Gruia Pitigoi-Aron, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 866 days.

(21) Appl. No.: 11/847,794

(22) Filed: Aug. 30, 2007

(65) Prior Publication Data
US 2009/0064175 A1    Mar. 5, 2009

(51) Int. Cl.
G06F 3/00 (2006.01)
G06F 9/44 (2006.01)

(52) U.S. Cl. .................................. 719/310; 717/163

(58) Field of Classification Search .............. 719/310; 717/136
See application file for complete search history.

(56) References Cited

U.S. PATENT DOCUMENTS

| | | | |
|---|---|---|---|
| 5,999,908 A | 12/1999 | Abelow | |
| 6,633,910 B1 | 10/2003 | Rajan et al. | |
| 6,763,353 B2 | 7/2004 | Li et al. | |
| 6,775,658 B1 | 8/2004 | Zothner | |
| 6,810,429 B1 | 10/2004 | Walsh et al. | |
| 7,065,566 B2 | 6/2006 | Menard et al. | |
| 7,103,556 B2 | 9/2006 | Del Rey et al. | |
| 7,107,224 B1 | 9/2006 | Weller et al. | |
| 7,111,076 B2 | 9/2006 | Abjanic et al. | |
| 7,146,618 B1 | 12/2006 | Mein et al. | |
| 7,194,733 B2 | 3/2007 | Ringseth et al. | |
| 7,668,815 B2 * | 2/2010 | Hild et al. | 707/999.004 |
| 2002/0099578 A1 | 7/2002 | Eicher, Jr. et al. | |
| 2003/0115119 A1 | 6/2003 | Schleicher | |
| 2003/0181991 A1 | 9/2003 | Chau et al. | |
| 2003/0236677 A1 | 12/2003 | Casati et al. | |
| 2004/0177053 A1 | 9/2004 | Donoho et al. | |
| 2004/0186891 A1 | 9/2004 | Panec et al. | |
| 2004/0205765 A1 | 10/2004 | Beringer et al. | |
| 2006/0143040 A1 | 6/2006 | Scheier et al. | |
| 2006/0248536 A1 | 11/2006 | Eckert | |
| 2007/0106998 A1 | 5/2007 | Zeldin et al. | |
| 2008/0120283 A1 | 5/2008 | Liu et al. | |

OTHER PUBLICATIONS

Kenneth Chiu, Investigating the Limits of SOAP Performance for Scientific Computing, 2002.*
Unknown, "Developing Adapters Using WCF," Welcome to MSDN Blogs, printed from, blogs.msdn.com/sonuarora/archive/2007/04/17/biztalk-multi-part-messages-and-the-biztalk-wcf-adapter.aspx, 2007, 2 pages, Microsoft Corporation, USA.

(Continued)

Primary Examiner — Lechi Truong
(74) Attorney, Agent, or Firm — Senniger Powers LLP (57) ABSTRACT

A business process adapter converts a SOAP (Simple Object Access Protocol) message into a business process message. A body path and a node encoding type are defined for the business process adapter. And, when the SOAP message is received, the business process adaptor extracts the node of the SOAP message at the location defined by the body path and encodes the node according to the defined node encoding type. Additionally, the business process adapter converts a business process message into a SOAP message using a defined content encoding type and a defined format of the SOAP message. When the business process message is received from the business process management server, the business process adapter encodes the body of the business process message according to the defined content encoding type and generates the SOAP message from the encoded body according to the defined format.

13 Claims, 4 Drawing Sheets

OTHER PUBLICATIONS

Vallapuzha et al., "Evolutionary Approach to Realizing SOA: A Microsoft Platform Example," SETLabs Briefings, vol. 5 No. 1, 2007, 11 pages, Infosys, Technology Limited, India.

Rodriguez, "MTOM Interoperability Between Oracle Application Server and Windows Communication Foundation Part 1: From WCF to Oracle," printed from weblogs.asp.net/gsusx/archive/2002/12/14/mtom-interoperability-between-oracle-application-server-and-windows-communication-founcation-part1-from-wcf-to-oracle.aspx, 2006, 5 pages, USA.

Unknown, "WCF Adapter for BizTalk Server 2006," printed from www.codeplex.com/WCFBizTalk/Project/ProjectRss.aspx, 2007, 6 pages, USA.

* cited by examiner

FIG. 4

EFFICIENT MARSHALLING BETWEEN SOAP AND BUSINESS-PROCESS MESSAGES

BACKGROUND

Typically, modern business processes depend at least in part on software. While some of these processes are supported by a single application, many others rely on diverse software systems. This software has commonly been created at different times, on different computer platforms, and using different technologies. Given this, automating those business processes requires connecting diverse systems.

Figure 1:
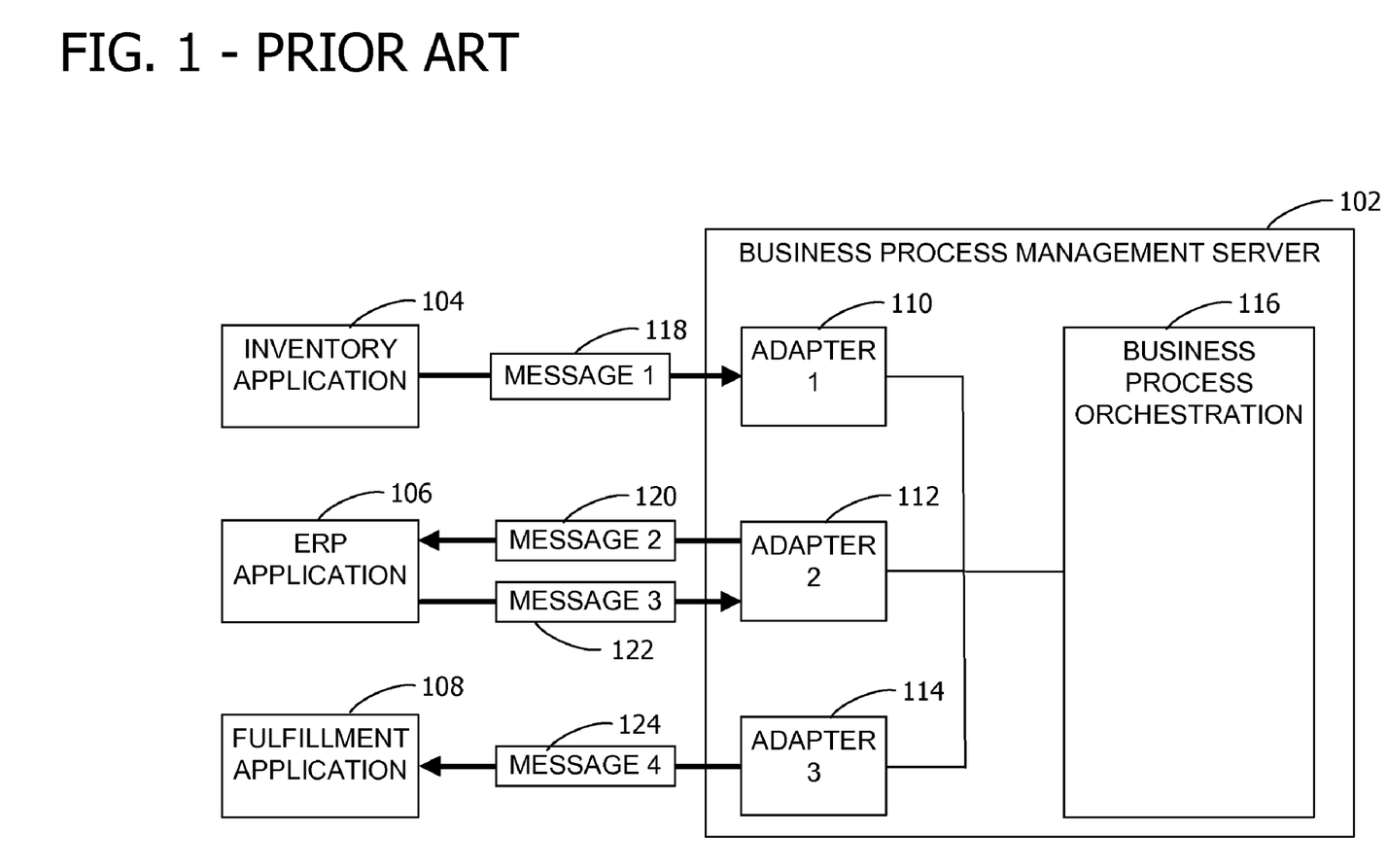
FIG. 1 is an exemplary embodiment of prior art business process management server.

Two scenarios are important for application integration. One is connecting applications within a single organization, commonly referred to as enterprise application integration (EAI). The other, called business-to-business (B2B) integration, connects applications in different organizations. FIG. 1 illustrates a simple example of a business process management server 102 of the prior art applied to an EAI problem. In this example, each application (application 104, application 106, and application 108) communicates using a different protocol. Accordingly, the messaging component of business process management server 102 implements adapters (e.g., adapter 110, adapter 112, adapter 114) to communicate with each application in its native protocol and/or message type. Additionally, no single application is aware of the complete business process. The business rules and/or business logic required to coordinate the software involved is implemented in a business process orchestration 116.

For example, an inventory application 104 running on a mainframe type computer notices that the stock of an item is low and issues a message 118 including a request to order more of that item. This message 118 is sent to a business process orchestration 116 via an adapter 110. The adapter 110 converts the message from the inventory application 104 format to business process management server 102 format and then forwards the converted message to the business process orchestration 116.

Next, the business process orchestration 116 issues a request to this organization's ERP (Enterprise Resource Planning) application 106 requesting a purchase order. The ERP application 106 executes on another computer type and adapter 112 converts the request into a message 120 in a format required by the ERP application 106 and then sends the message 110 to the ERP application 106. In response to the message 120, the ERP application 106 issues a purchase order and sends a message 122 including the purchase order to the business process management server 102 via adapter 112. As described above, the adapter converts the message 122 from the ERP application format to the business process management server format and forwards the message to the business process orchestration 116.

Lastly, the business process orchestration 116 issues a request to a fulfillment application 108 requesting the item should be ordered. The fulfillment application 108 executes on yet another computer type and adapter 114 converts the request into a message 124 in a format required by the fulfillment application 108 and then sends the message 124 to the fulfillment application 108.

Thus, the simple example described above illustrates the need for adapters that can be easily configured to process many different messages types and computer protocols.

SUMMARY

Embodiments of the invention include systems and methods for converting business process messages to SOAP (Simple Object Access Protocol) messages and vice versa. In an embodiment, the invention includes a method for converting a SOAP message into a business process message by a business process adapter. A body path and a node encoding type are defined for the business process adapter. When a SOAP message is received, the business process adaptor extracts the node of the SOAP message at the location defined by the body path and encodes the node according to the defined node encoding type. The business process message is generated from the extracted node and sent to the business process management server.

In another embodiment, a business process message is converted into a SOAP message by a business process adapter. A content encoding type and a format of the SOAP message are defined and associated with the business process adapter. When the business process message is received from the business process management server, the business process adapter encodes the body of the business process message according to the defined content encoding type and generates the SOAP message from the encoded body according to the defined format. The business process adapter sends the generated SOAP message via the business process adapter to an application.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 2:
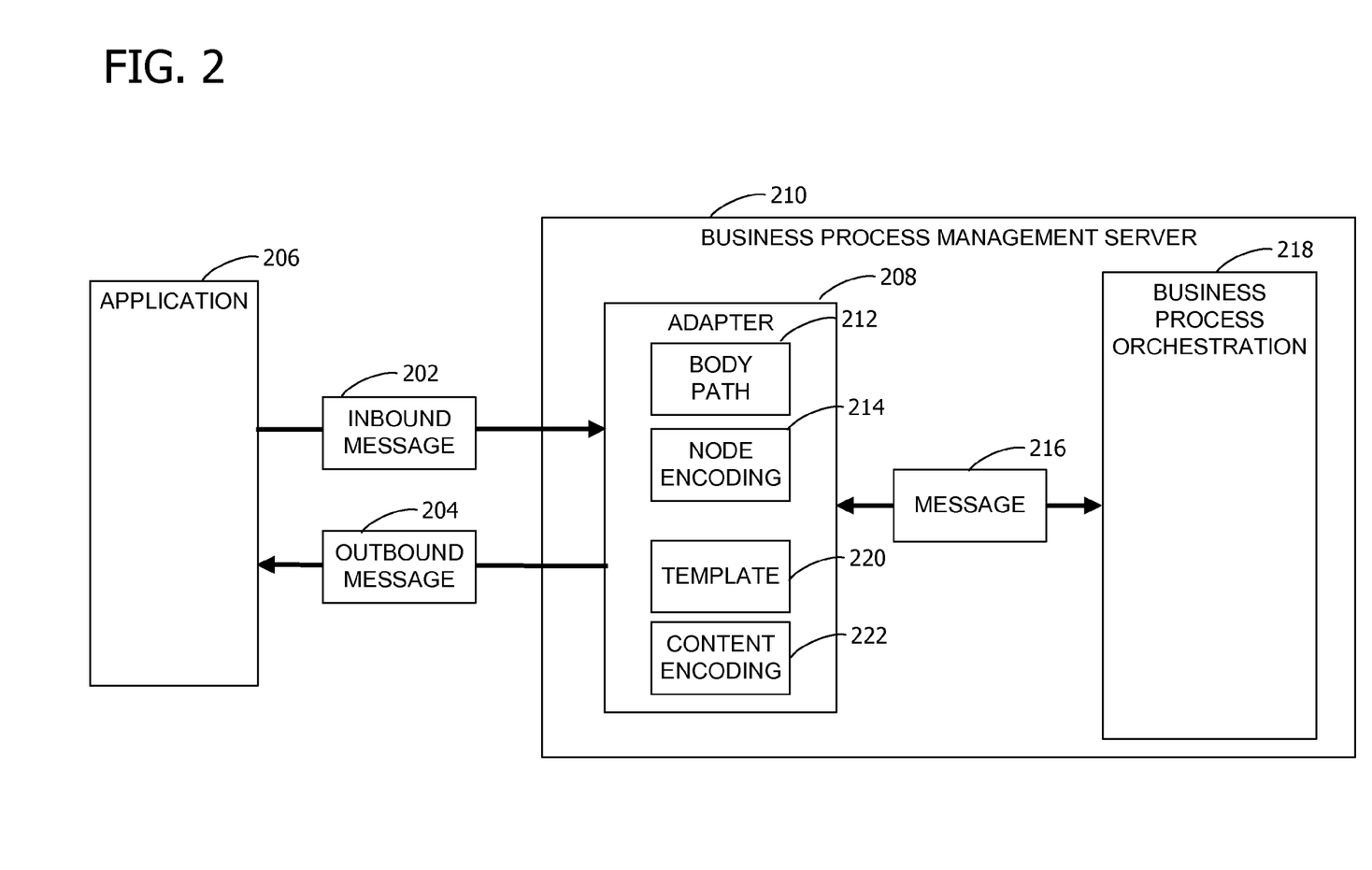
FIG. 2 is an exemplary block diagram illustrating a system of the invention for converting a business process management server messages to SOAP messages and vice versa.

In an embodiment, the invention includes systems and methods for converting SOAP (Simple Object Access Protocol) messages to business process management server messages and vise versa. FIG. 2 is a block diagram of a system for converting messages (e.g., inbound message 202, outbound message 204) for an application 206 by a business process adapter 208 according to one embodiment of the invention. The business process adapter 208 is associated with a business process management server 210. In an embodiment, the SOAP message is associated with the Windows® Communication Foundation (WCF), a communication subsystem to enable applications, in one machine or across multiple machines connected by a network, to communicate. In another embodiment, the business process management server 210 is a BizTalk® Server.

The business process adapter 208 is configured with computer-executable instructions for receiving SOAP messages (e.g. inbound message 202). The computer-executable instructions for receiving SOAP messages include instructions for defining a body path 212, defining a node encoding type 214, receiving the SOAP message, extracting the node of the SOAP message, generating the business process message 216 and sending the business process message 216 to the business process management server 210.

The defined body path 212 is associated with the business process adapter 208 and specifies the location of a node of the SOAP message. The defined node encoding type 214 is associated with the business process adapter 208 and specifies the encoding of the node. In an embodiment, the node encoding type 214 includes one or more of the following: string, hexadecimal, base64, and XML.

The business process management server 210 receives the SOAP message via the business process adapter 208. Next, the business process adapter 208 extracts the node of the SOAP message. The node is located in the SOAP message at the location defined by the body path 212 and the node is encoded according to the defined node encoding type 214. By defining the node encoding type 214, the adapter can read the node according to the encoding type without first determining how the node was encoded. Advantageously, performance will increase because no further translation of the node is required and disk space is reduced in situations where the decoded node results in less data than the encoded node (i.e. base64 encoded node decoded to binary data instead of string).

The business process adapter 208 generates the business process message 216 from the extracted node. The content of the business process message 216 includes the extracted node. Next, the business process adapter 208 sends the business process message 216 to the business process management server 210. In an embodiment, the business process adapter 208 sends the business process message 216 to a business process orchestration 218 of the business process management server 210. The business process orchestration 218 includes the business rules and/or business logic for a business process. Alternatively, the business process orchestration 218 is bypassed. In this case, the business process adapter 208 sends the business process message 216 directly to a routing process that sends the business process message 216 to another application.

In another embodiment, the business process adapter 208 is configured with computer-executable instructions for sending SOAP messages (e.g. outbound message 204). The computer-executable instructions for sending SOAP messages include instructions for defining a format of the SOAP message (e.g., template 220), defining a content encoding type 222, receiving the business process message 216, encoding the body of the business process message 216, generating the SOAP message, and sending the SOAP message to an application 206.

The defined format of the SOAP message is associated with the business process adapter 208. In an alternative embodiment, the format is defined as a template 220. The template 220 includes a XML message body element which defines the format of the SOAP message and the content encoding type 222 of the SOAP message. The business process adapter 208 generates the SOAP message including the template 220 by replacing the XML message body element with the encoded message body of the businesses process message 216.

The defined content encoding type 222 for the SOAP message is associated with the business process adapter 208. The content encoding type 222 includes one or more of the following: string, hexadecimal, base64, and XML.

Next, the business process adapter 208 receives the business process message 216 from the business process management server 210. In an embodiment, the business process adapter 208 receives the business process message 216 from a business process orchestration 218 of the business process management server 210. Alternatively, the business process orchestration 218 is bypassed. In this case, the business process adapter 208 receives the business process message 216 directly from a routing process that received the business process message 216 from another application. The business process adapter 208 encodes the body of the business process message 216 according to the defined content encoding type 222.

Next, the business process adapter 208 generates the SOAP message from the encoded body of the business process message 216. The content of the SOAP message includes the encoded body. In an embodiment, if the node encoding type 214 is string and the extracted node includes escaped data for XML special characters, the generated business process message 216 will include the restored escaped characters.

The business process adapter 208 sends the generated SOAP message (e.g., outbound message 204) via the business process adapter 208 to the application 206. The computer 210 may operate in a networked environment using logical connections to one or more remote computers and/or applications. The remote computer may be a personal computer, a server, a router, a network PC, a peer device or other common network node, and typically includes many or all of the elements described above relative to computer 210. The logical connections depicted in FIG. 2 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

In an embodiment, the system includes a user interface for defining one or more of the following: the body path 212 associated with the business process adapter 208, the node encoding type 214 associated with the business process adapter 208, the format of the SOAP message associated with the business process adapter 208, and the content encoding type 222 for the SOAP message associated with the business process adapter 208.

In another embodiment, system includes first business process adapter configured with computer-executable instructions for receiving SOAP messages, and a second business process adapter configured with computer-executable instructions for sending SOAP messages. In this embodiment, the first and said second business process adapters are not the same business process adapter.

In one embodiment of the invention, a computer such as the computer 210 is suitable for use in the other figures illustrated and described herein. The computer 210 typically has at least some form of computer readable media. Computer readable media, which include both volatile and nonvolatile media, removable and non-removable media, may be any available medium that may be accessed by computer 210.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 210.

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Figure 3:
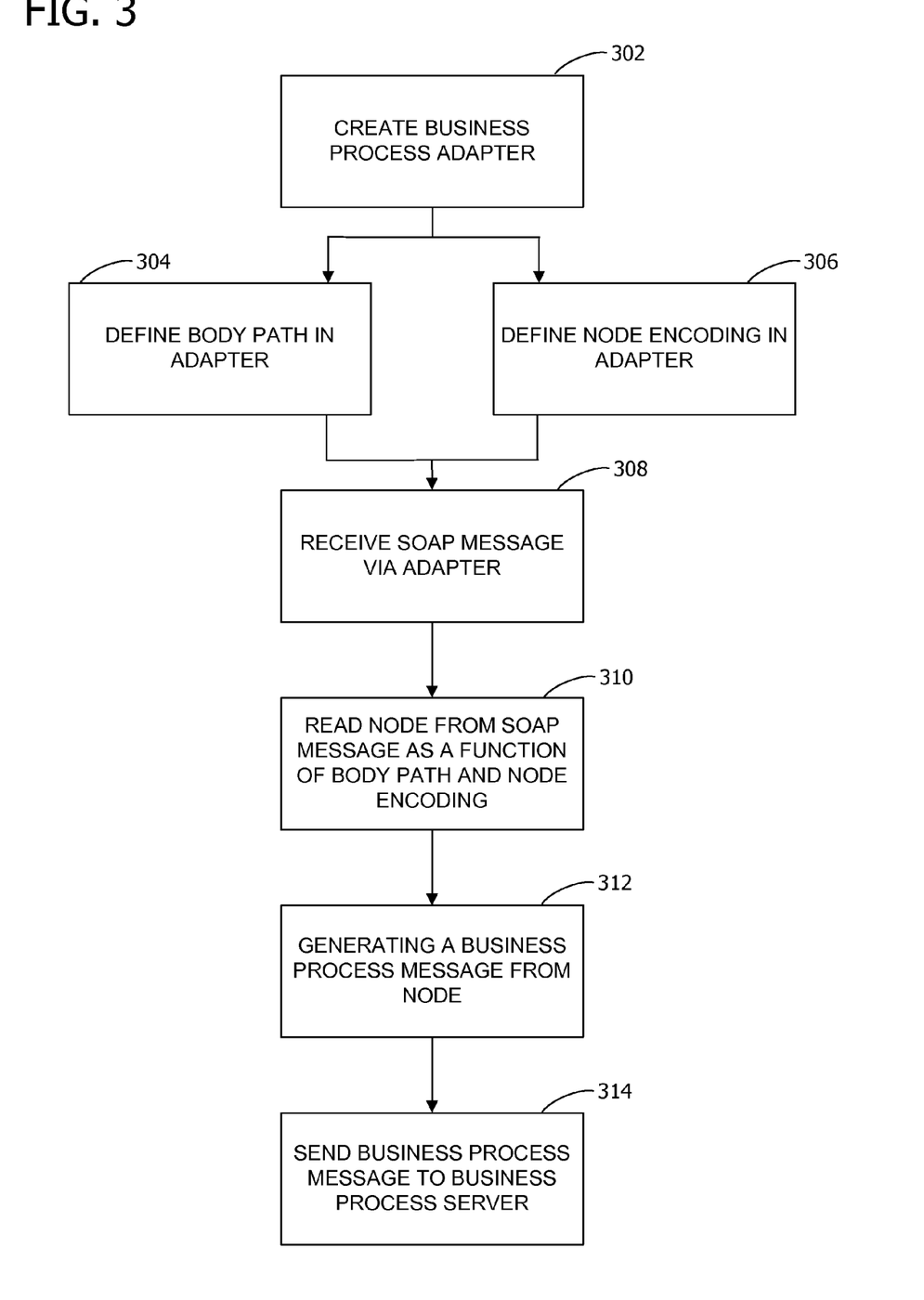
FIG. 3 is an exemplary flow chart illustrating operation of a business process adapter of the invention for converting a SOAP message to a business process management server message.

FIG. 3 is a flow diagram of a method for converting a SOAP message (e.g., inbound message 102) into a business process message 216 by a business process adapter 208. The business process adapter 208 is associated with a business process management server 210.

At 304, a body path 212 associated with the business process adapter 208 is defined. The body path 212 specifies the location of a node of the SOAP message. In an embodiment, the body path 212 is evaluated against the immediate child element of the SOAP body element of an incoming message. Advantageously, the node can be defined to include only the data without any SOAP or XML tags. In another embodiment, if the body path 212 matches more than one element, only the first matched element is used.

At 306, a node encoding type 214 associated with the business process adapter 208 is defined. The node encoding type 214 specifies the format of the node. In an embodiment, the node encoding type 214 includes one or more of the following: string, hexadecimal, base64, and XML. In another embodiment, the body path 212 and node encoding type 214 are defined by a user via a graphical user interface of the business process management server 210.

At 308, the business process adapter 208 receives the SOAP message (e.g., inbound message 202). In an embodiment, the business process adapter 208 receives the SOAP message from the application 206. The following is an exemplary SOAP message according to an embodiment of the invention:

```
<s:Envelope xmlns:s="http://www.w3.org/2003/05/soap-envelope"
xmlns:a="http://www.w3.org/2005/08/addressing">
    <s:Header>
        <!--Various headers go in here, the following are some examples-->
        <a:Action s:mustUnderstand="1">http://MyTestAction</a:Action>
        <a:MessageID>urn:uuid:e2322bc1-15d8-4f07-8a12-84203e5255f</a:MessageID>
        <a:ReplyTo>
            <a:Address>http://www.w3.org/2005/08/addressing/anonymous</a:Address>
        </a:ReplyTo>
        <a:To
s:mustUnderstand="1">net.tcp://localhost:9000/servicemodelsamples/service</a:To>
    </s:Header>
    <s:Body>
        <a>
            <b>
            Some text message here
            </b>
        </a>
    </s:Body>
</s:Envelope>
```

At 310, the business process adapter 208 extracts the node of the SOAP message. The node is located in the SOAP message at the location by the body path 212 defined at 304. And, the node is encoded according to the node encoding type 214 defined at 306. For example, from the exemplary message from above, if the body path is defined at "/a/b" and the node encoding type is "string", the business process adapter 208 extracts the node "Some text message here" using string encoding.

At 312, the business process adapter 208 generates the business process message 216 from the extracted node. The content of the business process message 216 includes the extracted node. In an embodiment, an empty business process message 216 is created if the extracted node does not include any data. In another embodiment, if the node encoding type 214 is defined as string and the extracted node includes escaped data for XML special characters, the generated business process message 216 will include the restored escaped characters. For example, if the matched node has escaped character data such as "<FirstName>CONTOSO</FirstName>", the business process adapter 208 generates "<FirstName>CONTOSO</FirstName>" in the generated business process message 216.

In yet another embodiment, if the node encoding type 214 is defined as XML, the generated business process message 216 will include the outer XML defined by the body path 212. For example, if the business process adapter 208 receives the following SOAP message:

And, the body path 212 is "/*[local-name( )='Order']/*[local-name( )='OrderDetail']/*[local-name( )='CustomerID']" and the node encoding type 214 is string, the character data "CONTOSO" is included in the business process message 216. In another example from the SOAP message above, if the body path 212 is "/*[local-name( )='Order']/*[local-name( )='OrderDetail']/*[local-name( )='CustomerID']" and the node encoding type 214 is XML, the character data "<CustomerIDxmlns="http://Samples.NetNamedPipe/OrderProcess">CONTOSO</CustomerID>" is included in the business process message 216.

At 314, the business process adapter 208 sends the business process message 216 to the business process management server 210. In an embodiment, the business process adapter 208 sends the business process message 216 to a business process orchestration 218 of the business process management server 210.

Figure 4:
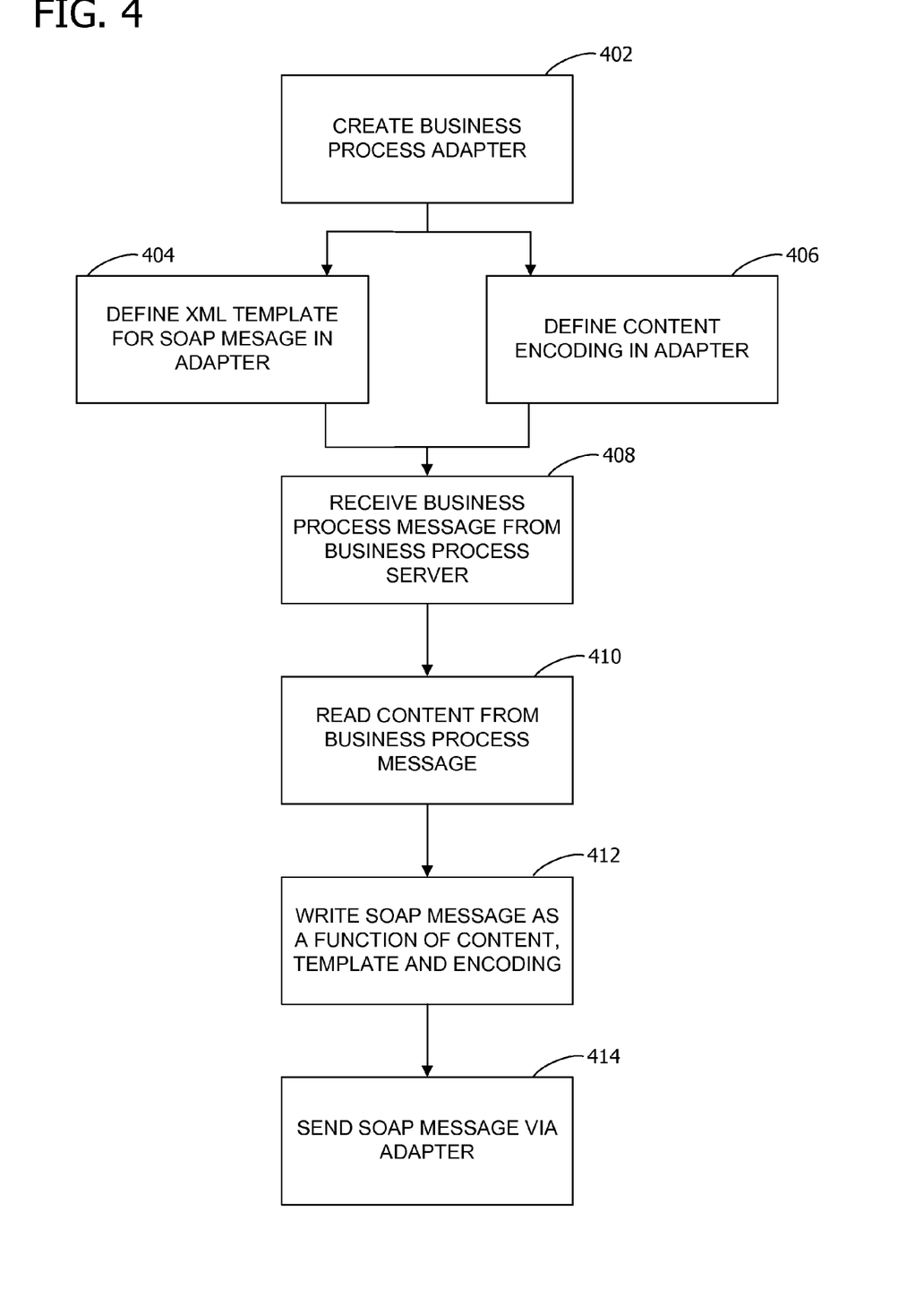
FIG. 4 is an exemplary flow chart illustrating operation of a business process adapter of the invention for converting a business process management server message to a SOAP message.

FIG. 4 is a flow diagram for a method for converting a business process message 216 into a SOAP message by a business process adapter 208 according to an embodiment of the invention. The business process adapter 208 is associated with a business process management server 210.

At 402, a business process adapter 208 is created on the business process management server 210. At 404, a format of the SOAP message is defined and associated with the created business process adapter 208. And, at 406, a content encoding type 222 for the SOAP message is defined and associated with the business process adapter 208. In an embodiment, the

```
<s:Envelope xmlns:s="http://www.w3.org/2003/05/soap-envelope"
xmlns:a="http://www.w3.org/2005/08/addressing">
    <s:Header>
        <a:Action
s:mustUnderstand="1">http://Samples.NetNamedPipe/OrderProcess/IOrderProcess/Order
Refresh</a:Action>
        <a:MessageID>urn:uuid:59e74507-66d0-4d50-be70-c3ec248b6f78</a:MessageID>
        <a:ReplyTo>
            <a:Address>http://www.w3.org/2005/08/addressing/anonymous</a:Address>
        </a:ReplyTo>
        <a:To
s:mustUnderstand="1">net.pipe://mycomputer/NetNamedPipeOrderProcessService</a:To>
    </s:Header>
    <s:Body>
        <Order xmlns="http://Samples.NetNamedPipe/OrderProcess">
            <OrderDetail>
                <CustomerID>CONTOSO</CustomerID>
                <OrderID>00000000</OrderID>
            </OrderDetail>
        </Order>
    </s:Body>
</s:Envelope>
``` content encoding type 222 includes one or more of the following: string, hexadecimal, base64, and XML. Alternatively, the format of the SOAP message and content encoding type 222 are defined by a user via a graphical user interface of the business process management server 210.

At 408, the business process adapter 208 receives the business process message 216 from the business process management server 210. In an alternative embodiment, the business process adapter 208 receives the business process message 216 from the business process orchestration 218 of the business process management server 210.

At 410, the business process adapter 208 encodes the body of the business process message 216 according to the defined content encoding type. And, at 412, the business process adapter 208 generates the SOAP message from the encoded body of the business process message 216. The content of the SOAP message includes the encoded body.

In alternative embodiment, the format of the SOAP message is defined as a template 220 including a XML message body element which defines the format of the SOAP message and the content encoding type 222 of the SOAP message. The generated SOAP message includes the template 220 where the encoded message body of the businesses process message replaces the XML message body element. The following is an example of a template according to aspects of an embodiment of the invention:

```
<a>
    <b>
        <bts-msg-body xmlns="http://www.aserver.com/schemas/bts2007" encoding = "base64"/>
    </b>
</a>
```

In another embodiment, if the template 220 is empty, an empty SOAP message is created. At 414, the business process adapter 208 sends the SOAP message (e.g., outbound message 204 to the application 206.

In another embodiment, if the content encoding type 222 is string, any XML special characters in the businesses process message are escaped when encoded and the generated SOAP message will include the escaped characters.

In yet another embodiment, if the content encoding type 222 is base64 or hex, the generated SOAP message will include the business process message 216 body encoded in at least one of the following: BinHex and Base 64.

For example, if content encoding type 222 is string and the template 220 is defined as:

```
<Book>
    <bts-msg-body xmlns="http://www.a.com/schemas/bts2007" encoding="string"/>
</Book>
```

Then the following message is generated:

```
<s:Envelope xmlns:s="http://www.w3.org/2003/05/soap-envelope"
xmlns:a="http://www.w3.org/2005/08/addressing">
    <s:Header>
        <a:Action s:mustUnderstand="1">http://Samples.NetNamedPipe/OrderProcess/IOrderProcess/Request</a:Action>
        <a:MessageID>urn:uuid:05dde292-eedd-467e-b0d2-f1b8f0757410</a:MessageID>
        <a:ReplyTo>
            <a:Address>http://www.w3.org/2005/08/addressing/anonymous</a:Address>
        </a:ReplyTo>
        <a:To s:mustUnderstand="1">net.pipe://mycomputer/NetNamedPipeOrderProcessService</a:To>
    </s:Header>
    <s:Body>
        <Book><ns0:Order xmlns:ns0="http://Samples.NetNamedPipe/OrderProcess">
<ns0:OrderDetail> <ns0:CustomerID>CONTOSO</ns0:CustomerID>
<ns0 OrderID> 01A2c</ns0:OrderID>
</ns0:OrderDetail></ns0:Order>
        </Book>
    </s:Body>
</s:Envelope>
```

If content encoding type 222 is base64 and the template 220 is defined as:

```
<Book>
<bts-msg-body xmlns="http://www.microsoft.com/schemas/bts2007"
encoding="base64"/>
</Book>
```

Then the following message is generated:

```
<s:Envelope xmlns:s="http://www.w3.org/2003/05/soap-envelope"
xmlns:a="http://www.w3.org/2005/08/addressing">
    <s:Header>
        <a:Action s:mustUnderstand="1">http://Samples.NetNamedPipe/OrderProcess/
IOrderProcess/Request</a:Action>
        <a:MessageID>urn:uuid:cb3cac6d-a542-4a90-bad8-cdbfa8251112</a:MessageID>
        <a:ReplyTo>
            <a:Address>http://www.w3.org/2005/08/addressing/anonymous</a:Address>
        </a:ReplyTo>
        <a:To s:mustUnderstand="1">net.pipe://mycomputer/NetNamedPipeOrderProcessService</a:To>
    </s:Header>
    <s:Body>
        <Book>77u/PG5zMDpPcmRlciB4bWxuczpuczA9Imh0dHA6Ly9NaWNyb3NvZn
            QuU2FtcGxlcy5CaXpUYWxrLk5ldE5hbWVkUGlwZS9PcmRlclByb2Nlc3MiPg0K
            ICA8bnMwOk9yZGVyRGV0YWlsPg0KICAgIDxuczA6Q3VzdG9tZXJJRD5D
            T05UT1NPPC9uczA6Q3VzdG9tZXJJRD4NCiAgICA8bnMwOk9yZGVyySUQ+
            +MDFBMmM8L25zMDpPcmRlcklEPg0KICA8L25zMDpPcmRlcklRldGFpbD4NCj
            wvbnMwOk9yZGVyPg==</Book>
    </s:Body>
</s:Envelope>
```

If content encoding type 222 is XML and the template 220 is defined as:

```
<Book>
<bts-msg-body xmlns="http://www.microsoft.com/schemas/bts2007"
encoding="XML"/>
</Book>
```

Then the following message is generated:

```
<s:Envelope xmlns:s="http://www.w3.org/2003/05/soap-envelope"
xmlns:a="http://www.w3.org/2005/08/addressing">
    <s:Header>
        <a:Action
s:mustUnderstand="1">http://.Samples..NetNamedPipe/OrderProcess/IOrderProcess/Request</a:Action>
        <a:MessageID>{513C123C-0600-4A1C-BEE2-EF83E0EFEB15}</a:MessageID>
        <a:ReplyTo>
            <a:Address>http://www.w3.org/2005/08/addressing/anonymous</a:Address>
        </a:ReplyTo>
        <a:To
s:mustUnderstand="1">net.pipe://mycomputer/NetNamedPipeOrderProcessService</a:To>
    </s:Header>
    <s:Body>
        <Book>
            <ns0:Order xmlns:ns0="http://Samples.NetNamedPipe/OrderProcess">
    <ns0:OrderDetail>
        <ns0:CustomerID>CustomerID_0</ns0:CustomerID>
        <ns0:OrderID>OrderID_0</ns0:OrderID>
    </ns0:OrderDetail>
</ns0:Order>
        </Book>
    </s:Body>
</s:Envelope>
```

Referring again to FIG. 2, FIG. 2 shows one example of a general purpose computing device in the form of a computer 210. The system memory computer storage media in the form of removable and/or non-removable, volatile and/or nonvolatile memory. In the illustrated embodiment, system memory includes read only memory (ROM) and random access memory (RAM). A basic input/output system (BIOS), containing the basic routines that help to transfer information between elements within computer 202, such as during startup, is typically stored in ROM. RAM typically contains data and/or program modules that are immediately accessible to and/or presently being operated on by processing unit. By way of example, and not limitation, FIG. 2, application programs 218, other program modules 208, and program data 212, 214, 220, 222.

Generally, the data processors of computer 210 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computer 210 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for converting a SOAP (Simple Object Access Protocol) message into a business process message by a business process adapter, said business process adapter associated with a business process management server, said method comprising:
    defining a body path associated with the business process adapter, said body path specifying a location of a node of the SOAP message;
    defining a node encoding type associated with the business process adapter, said node encoding type specifying a format of the node;
    receiving the SOAP message via the business process adapter;
    extracting the node of the SOAP message wherein the node is located in the SOAP message at the location defined by the body path and the node is encoded according to the defined node encoding type;
    generating the business process message from the extracted node wherein a content of the business process message includes the extracted node; and
    sending the business process message to the business process management server; and
    wherein the business process adapter configured with computer-executable instructions for sending SOAP messages, said instructions for:
    defining a format of the SOAP message associated with the business process adapter;
    defining a content encoding type for the SOAP message associated with the business process adapter;
    receiving the business process message from the business process management server;
    encoding a body of the business process message according to the defined content encoding type;
    generating the SOAP message from the encoded body of the business process message according to the defined format wherein the content of the SOAP message includes the encoded body; and
    sending the SOAP message via the business process adapter to an application.

2. The method of claim 1, wherein the node encoding type includes one or more of the following: string, hexadecimal, base64, and XML.

3. The method of claim 1, wherein if the extracted node does not include any data, an empty business process message is created.

4. The method of claim 1, wherein if the node encoding type is string and the extracted node includes escaped data for XML special characters, the generated business process message will include a restored escaped characters.

5. The method of claim 1, wherein if the node encoding type is XML, the generated business process message will include an outer XML defined by the body path.

6. The method of claim 1, wherein the body path and node encoding type are defined by a user via a graphical user interface of the business process management server.

7. A system for converting messages by a business process adapter, said business process adapter associated with a business process management server, comprising:
    a processor;
    the business process adapter configured on processor with computer-executable instructions for receiving SOAP messages, said instructions for:

defining a body path associated with the business process adapter, said body path specifying a location of a node of the SOAP message;

defining a node encoding type associated with the business process adapter, said node encoding type specifying a format of the node;

receiving the SOAP message via the business process adapter; extracting the node of the SOAP message wherein the node is located in the SOAP message at the location defined by the body path and the node is encoded according to the defined node encoding type;

generating the business process message from the extracted node wherein a content of the business process message includes the extracted node; and sending the business process message to the business process management server; and the business process adapter configured with computer-executable instructions for sending SOAP messages, said instructions for:

defining a format of the SOAP message associated with the business process adapter;

defining a content encoding type for the SOAP message associated with the business process adapter;

receiving the business process message from the business process management server;

encoding a body of the business process message according to the defined content encoding type;

generating the SOAP message from the encoded body of the business process message according to the defined format wherein the content of the SOAP message includes the encoded body; and sending the SOAP message via the business process adapter to an application.

8. The system of claim 7, further comprising:

a user interface for defining one or more of the following: the body path associated with the business process adapter, the node encoding type associated with the business process adapter, the format of the SOAP message associated with the business process adapter, and the content encoding type for the SOAP message associated with the business process adapter.

9. The system of claim 7, further comprising:

a first business process adapter configured with computer-executable instructions for receiving SOAP messages; and a second business process adapter configured with computer-executable instructions for sending SOAP messages wherein the first and said second business process adapters are not the same business process adapter.

10. The system of claim 7, wherein the business adapter further comprises:

defining a template including a XML message body element wherein the format of the SOAP message and the content encoding type of the SOAP message are defined; and generating a SOAP message including the template wherein the encoded message body of the businesses process message replaces the XML message body element.

11. The system of claim 7, wherein the node encoding type includes one or more of the following: string, hexadecimal, base64, and XML.

12. The system of claim 7, wherein the content encoding type includes one or more of the following: string, hexadecimal, base64, and XML.

13. The method of claim 7, wherein if the node encoding type is string and the extracted node includes escaped data for XML special characters, the generated business process message will include a restored escaped characters.

* * * * *